US010224972B2

(12) United States Patent
Trau et al.

(10) Patent No.: US 10,224,972 B2
(45) Date of Patent: Mar. 5, 2019

(54) SYSTEMS, METHODS, AND COMPUTER-READABLE MEDIA FOR TRACKING UPDATES AND LOADING DATA

(71) Applicant: Giesecke & Devrient America, Inc., Dulles, VA (US)

(72) Inventors: Paul Trau, Dulles, VA (US); Eric Johnson, Dulles, VA (US); Fahad Saleem Syed, Dulles, VA (US)

(73) Assignee: Giesecke+Devrient Mobile Security America, Inc., Dulles, VA (US)

( * ) Notice: Subject to any disclaimer, the term of this patent is extended or adjusted under 35 U.S.C. 154(b) by 0 days.

(21) Appl. No.: 15/023,985

(22) PCT Filed: Sep. 10, 2015

(86) PCT No.: PCT/US2015/049454
§ 371 (c)(1),
(2) Date: Mar. 22, 2016

(87) PCT Pub. No.: WO2016/040652
PCT Pub. Date: Mar. 17, 2016

(65) Prior Publication Data
US 2016/0218763 A1      Jul. 28, 2016

Related U.S. Application Data

(60) Provisional application No. 62/049,235, filed on Sep. 11, 2014.

(51) Int. Cl.
*H04B 1/3816* (2015.01)
*H04L 29/08* (2006.01)
*H04W 8/26* (2009.01)

(52) U.S. Cl.
CPC ........... *H04B 1/3816* (2013.01); *H04L 67/06* (2013.01); *H04L 67/2842* (2013.01); *H04W 8/265* (2013.01)

(58) Field of Classification Search
CPC ..................................................... H04W 8/183
(Continued)

(56) References Cited

U.S. PATENT DOCUMENTS

| 2004/0117785 A1* | 6/2004 | Kincaid | H04W 8/20 717/170 |
| 2009/0088211 A1 | 4/2009 | Kim | |

(Continued)

FOREIGN PATENT DOCUMENTS

| EP | 1662822 A1 | 5/2006 |
| WO | 2013/086055 A1 | 6/2013 |

OTHER PUBLICATIONS

Korean Intellectual Property Office, International Search Report and Written Opinion for International Application No. PCT/US2015/049454, dated Jan. 25, 2016.

*Primary Examiner* — Gary Lafontant
(74) *Attorney, Agent, or Firm* — Drinker Biddle & Reath LLP (57) ABSTRACT

Methods, systems, and media for monitoring updates on a data carrier module include processes of initializing the mobile device to communicate on a telecommunications network, updating data files on the data carrier module, and reinitializing the mobile device to communicate on the telecommunications network. Initializing the mobile device includes storing a list of version numbers for monitored data files and the monitored data files from the data carrier module in a cache. Updating includes updating the version number of a monitored data file when the content of the monitored data file is updated on the data carrier module. Reinitializing the mobile device includes determining whether the version numbers of any monitored data files have changed, copying updated monitored data files from the data carrier module to the cache in response to deter- (Continued)

mining that the version numbers of such data files changed, and loading the monitored data files from the cache.

20 Claims, 7 Drawing Sheets

(58) Field of Classification Search
USPC .......................................................... 455/558
See application file for complete search history.

(56) References Cited

U.S. PATENT DOCUMENTS

2014/0057679 A1\* 2/2014 Berionne .............. H04W 8/205
455/558
2014/0154979 A1 6/2014 Tomas et al.

\* cited by examiner

| IDENTIFIER: '3F00/7F48/6F04' | STRUCTURE: LINEAR FIXED | MANDATORY |
|---|---|---|
| RECORD SIZE: 13 (40 RECORDS) | | UPDATE ACTIVITY: LOW |
| ACCESS CONDITIONS<br>  READ         ALW<br>  UPDATE    ADM1<br>  DELETE     ADM1<br>  ACTIVATE  ADM1<br>  DEACTIVATE ADM1 | | |

| BYTES | DESCRIPTION | M/O | LENGTH |
|---|---|---|---|
| 1 | Index of record in EF$_{Dir}$ for the ADF the flagged file belongs to. An index of "00" indicates the file is located under the MF. | M | 1 BYTE |
| 2-3 | Counter to indicate changes. The counter is incremented by one for each update of a file. | M | 2 BYTES |
| 4 | Length of flagged file path | M | 1 BYTE |
| 5-X | File path of the flagged file that is monitored. | M | X BYTES |
| X+1-13 | Trailing 'FF' bytes | O | 10-X BYTES |

SYSTEMS, METHODS, AND COMPUTER-READABLE MEDIA FOR TRACKING UPDATES AND LOADING DATA

CROSS-REFERENCE TO RELATED APPLICATIONS

This application is a U.S. National Stage Patent Application under 37 U.S.C. § 371 of International Patent Application No. PCT/US2015/049454, filed Sep. 10, 2015, which claims priority to U.S. Provisional Patent Application Ser. No. 62/049,235, filed Sep. 11, 2014, the disclosures of which are incorporated by reference herein in their entirety.

TECHNICAL FIELD

The present disclosure relates generally to mobile communications, and more specifically to systems, methods, and computer-readable media for tracking updates and loading data.

BACKGROUND

Wireless communication networks provide various communication services such as telephony, video, data, messaging, and broadcasts. Such networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology. The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS supports enhanced 3G data communications protocols, such as High Speed Packet Access (HSPA), which provides greater data transfer speeds and capacity to associated UMTS networks. Other example networks include GPRS/EDGE, CDMA/DO, or EUTRAN (4G LTE). Such wireless communication networks may follow standards implemented by the European Telecommunications Standards Institute (ETSI) or the Third Generation Partnership Project (3GPP), for example.

Contemporary wireless devices frequently include a subscriber identity module (SIM) card to facilitate communication with a communication network via a subscription for the designated voice or data subscription of the wireless device. When a SIM card is initialized (e.g., at boot-up after powering on or after a SIM card is inserted into the wireless device), the wireless device reads the content of several files stored on the SIM card. For example, during the initialization process various features stored on the SIM card, such as an address book, text messages, network names, or other carrier or subscriber information, are read and made available to the wireless device. Consequently, the initialization process may take a significant amount of time depending on the number of files on the SIM card, the size of the files on the SIM card, or the number of records of the files on the SIM card. For example, each file on the SIM card may contain up to 255 records. Thus, if it takes an average of 20 ms to read each record, the initialization process may take over 5 seconds to read that a single file on the SIM card. Consequently, a user of the wireless device may be prevented from accessing services on the wireless device until after the related files have been read from the SIM card during the initialization process. Thus, the user may have to wait an undesirable amount of time after powering on the wireless device or after inserting a SIM card before desired features (e.g., Internet connectivity, outbound/inbound calling, inbound/outbound messaging) become available.

SUMMARY OF THE INVENTION

According to aspects of the present disclosure, methods, systems, and media disclosed herein for monitoring updates on a data carrier include processes of installing the data carrier in a mobile device, initializing the mobile device to communicate on a telecommunications network, updating data files on the data carrier, and reinitializing the mobile device to communicate on the telecommunications network.

The process of initializing the mobile device to communicate on a telecommunications network includes processes of obtaining a first identifier from the data carrier; determining whether the first identifier is a known identifier; obtaining a plurality of data files currently stored on the data carrier from the data carrier; storing the plurality of data files obtained from the data carrier in a cache of the mobile device; and loading the monitored data files currently stored in the cache. The first identifier identifies the data carrier. The plurality of data files includes a first data file including a list of monitored data files; a second data file including a list of version numbers including a version number for each of the monitored data files included in the list of monitored data files; and each of the monitored data files included in the list of monitored data files.

The updating data files on the data carrier includes a process of updating the second data file in response to receiving, at the data carrier, updated content for at least one of the monitored data files. Updating the second data file includes changing the version number for the at least one of the monitored data files to a different version number; and replacing the second data file currently stored on the data carrier with an updated second data file including the different version number for the at least one of the monitored data files.

The process of reinitializing the mobile device to communicate on the telecommunications network includes processes of obtaining a second identifier from the data carrier; determining whether the second identifier is the same as the first identifier; determining whether the version number of a respective data file in the second data file currently stored in the cache is the same as the version number of the respective data file in the second data file currently stored on the data carrier; obtaining the respective data file currently stored on the data carrier from the data carrier when the version numbers are not the same; replacing the respective data file currently stored in the cache with the respective data file obtained from the data carrier; replacing the second data file currently stored in the cache with the second data file obtained from the data carrier when the version numbers are not the same; and loading the monitored data files currently stored in the cache.

Other objects, features, and advantages will be apparent to persons of ordinary skill in the art from the following detailed description and the accompanying drawings.

BRIEF DESCRIPTION OF THE DRAWINGS

For a more complete understanding of the present invention, needs satisfied thereby, and the objects, features, and advantages thereof, reference now is made to the following description taken in connection with the accompanying drawings.

DETAILED DESCRIPTION OF THE INVENTION

An important user perception when using a mobile phone is how long it takes the mobile equipment (ME) to register on the network after the device is powered on. One factor affecting this length of time is the time the ME takes to read subscription and configuration information from a subscriber identity module (SIM) or other universal integrated circuit card (UICC). The UICC interface is a serial interface, and, consequently, the time to select and read the files on the UICC is often substantial. Typically, the UICC present when a piece of ME is powered on is the same UICC that was present when the ME was previously powered down. Consequently, it is possible for such ME to cache the data previously read from the UICC and skip the process of reading the same data from the UICC a second time.

One of the strengths of the systems implementing ETSI or 3GPP standards, for example, is that the UICC is removable from ME. Therefore, caching of data performed by certain implementations of ME described herein addresses the possibility that the UICC may have been updated in another device between power cycles. Similarly there may be some internal processes on the UICC that update the file content between power cycles, which are addressed by particular implementations of ME described herein. Consequently, various example implementations of systems, processes, and media described herein provide various mechanisms to support a caching process in a reliable and backward compatible manner. In view of the foregoing, a mechanism that allows ME to determine if a cached version of data from the UICC is up-to-date may be desirable.

Example implementations of the present invention provide methods, systems, and non-transitory computer-readable media for tracking updates and loading data. Such example implementations of the present invention, and their features and advantages, may be understood by referring to FIGS. 1-7, like numerals being used for corresponding parts in the various drawings. It is to be understood that processes described herein and shown in FIGS. 1-7 are not limited to the particular order of steps described herein, and the order of such steps may be rearranged where possible. Further, certain steps described herein may be performed in parallel, omitted, or performed multiple times where appropriate.

Moreover, it is to be understood that processes described herein as being performed by the various example devices are not limited to performance by such devices and may be performed by any combination of one or more devices able to perform such processes or sub-processes thereof. While certain exemplary configurations disclosed herein are described with respect to SIMs and UIICs (each a data carrier module), certain systems and methods disclosed herein can be readily used with other types of data carrier modules. For example, a simple storage device (e.g., micro-SD cards and equivalents), which would require the ME or another processor to update version number information, would be another example of a data carrier module. Still another exemplary data carrier module would be a storage device including a processor that manages the version number information, such as a portion of a flash memory controller chip. Yet another example of a data carrier module would be a virtual SIM or an electronic SIM ("eSIM") (e.g., a data set that is loaded onto a UICC), such as the ones used in a Subscription Management system (e.g., GSMA Remote Provisioning Architecture). In certain implementations, the data set corresponding to a virtual SIM or an eSIM contains the files and application code for managing the version number information.

Figure 1:
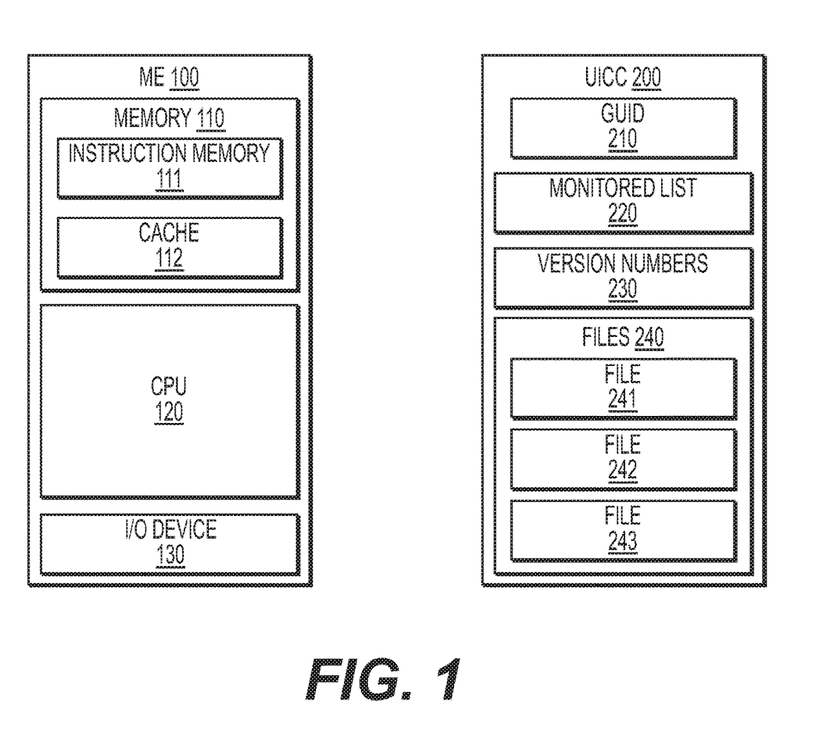
FIG. 1 is a schematic representation showing an implementation of mobile equipment and a universal integrated circuit card (UICC) used to access a telecommunications network.

Referring to FIG. 1, a schematic representation showing an implementation of ME 100 and a UICC 200 now is described. In the illustrated schematic representation a system including ME 100 and UICC 200, which may be installed in ME 100. In the implementation of FIG. 1, ME 100 includes a memory 110, a central-processing unit (CPU) 120, and an input and output (I/O) device 130. Memory 110 includes an instruction memory 111 configured to store computer-readable instructions that may instruct ME 100 to perform certain processes. Memory 110 also includes a cache 112 configured to store data obtained from UICC 200, for example.

When executed by CPU 120, the computer-readable instructions stored in memory instruction memory 111 instruct CPU 120 to operate as one or more of a plurality of functional components configured to perform one or more of the processes described herein. In particular implementations, such functional components may be implemented on different CPUs or even on different MEs 100. I/O device 130 is configured to transmit information between ME 100 and other devices within a telecommunications network, to receive input from a user, to provide output for a user, and to obtain information from and provide information to UICC 200, for example. Examples of ME 100 include, but are not limited to, mobile telephones, walkie-talkies, personal digital assistants, smart phones, tablet computers, laptops and other computers, automobiles, household appliances, drones, and any other device that may conceivably connect with a telecommunications network.

In the implementation of FIG. 1, UICC 200 functions as a memory with a plurality of memory areas configured to store a globally unique identifier (GUID) 210 for UICC 200, a file including a list of monitored files 220 (described below in more detail), a file including a list of version numbers 230 (described below in more detail) corresponding to the files listed in the list of monitored files 220, and a plurality of files 240 storing various content associated with initializing ME 100 for communication on a telecommunication network. For example, files 240 include a file 241 including carrier settings, a file 242 including subscriber information, and a file 243 including address-book information. In certain implementations, UICC 200 includes a processing component, such as a CPU, an interpreter, a controller, an application specific integrated circuit (ASIC), or other component able to perform computational tasks. Examples of UICC 200 include, but are not limited to, SIM cards and any other data carriers that may provide information to ME 100.

Referring to FIGS. 2-5, processes performed by certain implementations of ME and UICCs now are described. Initially, when a UICC, such as UICC 200, is installed into a piece of ME, such as ME 100, the ME obtains the GUID of the UICC. If the ME does not recognize the GUID, the ME identifies the files for initialization (e.g., files 240) stored on UICC, reads the files, and stores the files in the ME's cache, such that ME is able to access the files and initialize itself for communication on a network without loading further initialization information from UICC. Nevertheless, ME also obtains a list of monitored files and a list of version numbers assigned to each of the monitored files from the UICC. ME associates the list of monitored files with the GUID of the UICC.

The list of monitored files is a list of files stored on the UICC that are being monitored for updates. Criteria for selecting which files are monitored files are described below in more detail. Generally, however, the monitored files are files that are used to initialize ME for communication on a telecommunication network. As will be described in more detail below, the list of version numbers is used to determine whether one or more of the monitored files has been updated. In some implementations, a registry list including a list of updated files is used in place of the list of monitored files and the list of version numbers for such files. In still other implementations, a registry list of all monitored files that includes information indicating which of the monitored files has been updated may be used in place of the list of monitored files and the list of version numbers for such files.

Subsequent initializations of ME now are described with reference to FIG. 2. In S201, a UICC is installed in the ME. S201 may be omitted if a UICC has already been installed in ME. In S202, ME obtains the GUID from the UICC and determines whether the obtained GUID is the same GUID that is affiliated with the list of monitored files stored in the cache. If the obtained GUID is different from the GUID that is affiliated with the list of monitored files stored in the cache, the ME repeats the above described procedure by: identifying the files for initialization stored on UICC; reading from the UICC the files for initialization, the file including the list of monitored files, and the file including the list of version numbers of the monitored files; and stores each of these files in the ME's cache. If the obtained GUID is the same as the GUID that is affiliated with the list of monitored files stored in the cache, the ME proceeds to S203 and requests the list of monitored files from the UICC. Subsequently, the ME receives the list of monitored files from the UICC in S205 and stores the list in the cache. Similarly, the ME requests the list of version numbers of the monitored files from the UICC in S207 and receives the list of version numbers from the UICC in S209. In S211, the ME subsequently accesses the list of version numbers previously stored in the cache and compares this list with the list of version numbers received from the UICC in S209. In S213, the ME determines whether the version number of each file stored in the cache is the same as the version number of a respective corresponding file stored on the UICC based on the comparison of the list of version numbers stored in the cache and the list of version numbers received from the UICC in S209. For each monitored file, if the version numbers from the cache and the UICC are the same (S213: YES), the initialization process proceeds to S215, and the ME loads the instance of the monitored file currently stored in the cache.

Alternatively, if the version numbers for the monitored file from the cache and the UICC are not the same (S213: NO), the initialization process proceeds to S217, and the ME reads the instance of the monitored file currently stored on the UICC. Subsequently, the ME stores the read instance of the monitored file in the cache in S219. Thereafter, the initialization process proceeds to S215 and the ME loads the instance of the monitored file currently stored in the cache (e.g., the instance most recently read from the UICC). Once all of the monitored files and any other files required for initialization of the ME have been loaded in S215, ME replaces the list of version numbers stored in the cache with the list of version numbers obtained from the UICC in S209, and the process proceeds to S221 at which time the initialization process for the ME is completed.

Figure 2:
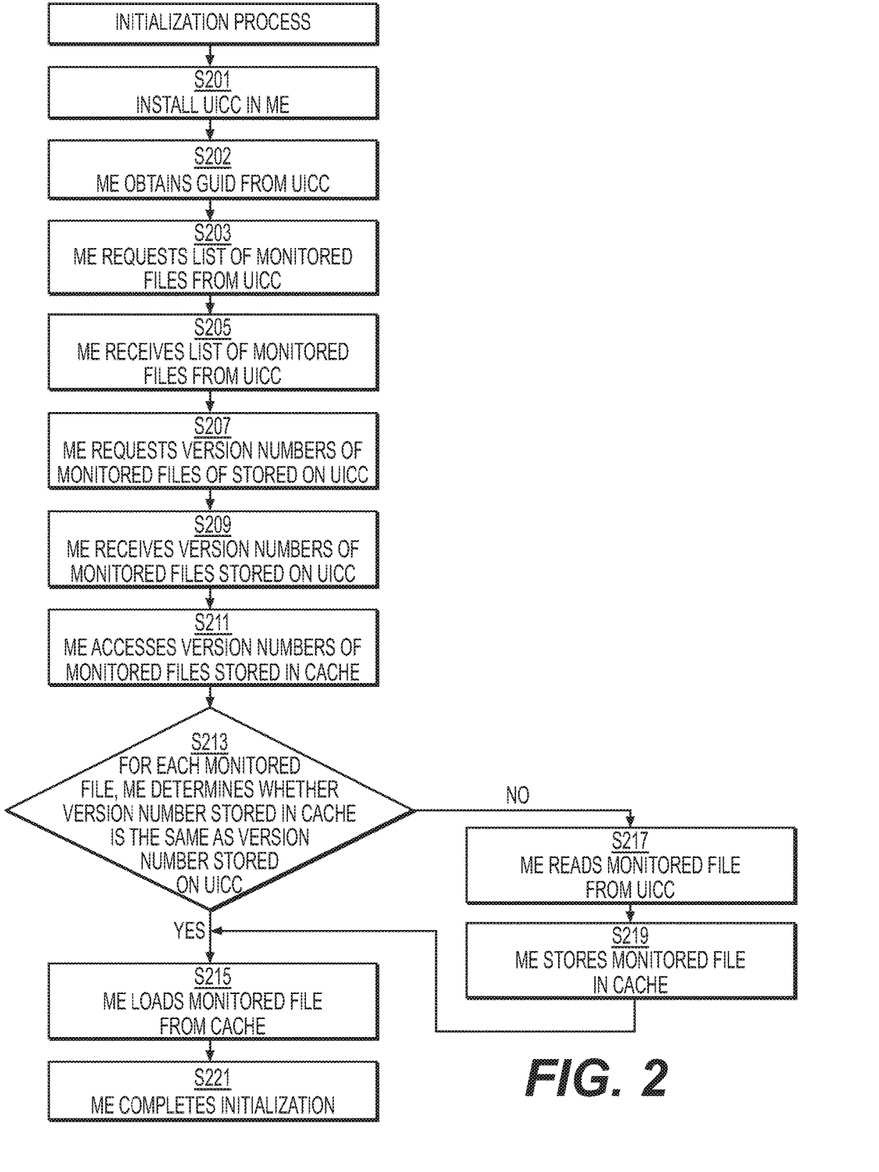
FIG. 2 is a flow chart showing an implementation of an initialization process performed by the ME shown in FIG. 1.

Although the example implementation of FIG. 2 shows steps of obtaining the monitored file list from UICC (e.g., S203, S205) during subsequent initialization processes, these steps may be omitted. In certain implementations, for example, ME only obtains the list of monitored files when ME does not recognize the GUID of the UICC obtained in S202.

Figure 3:
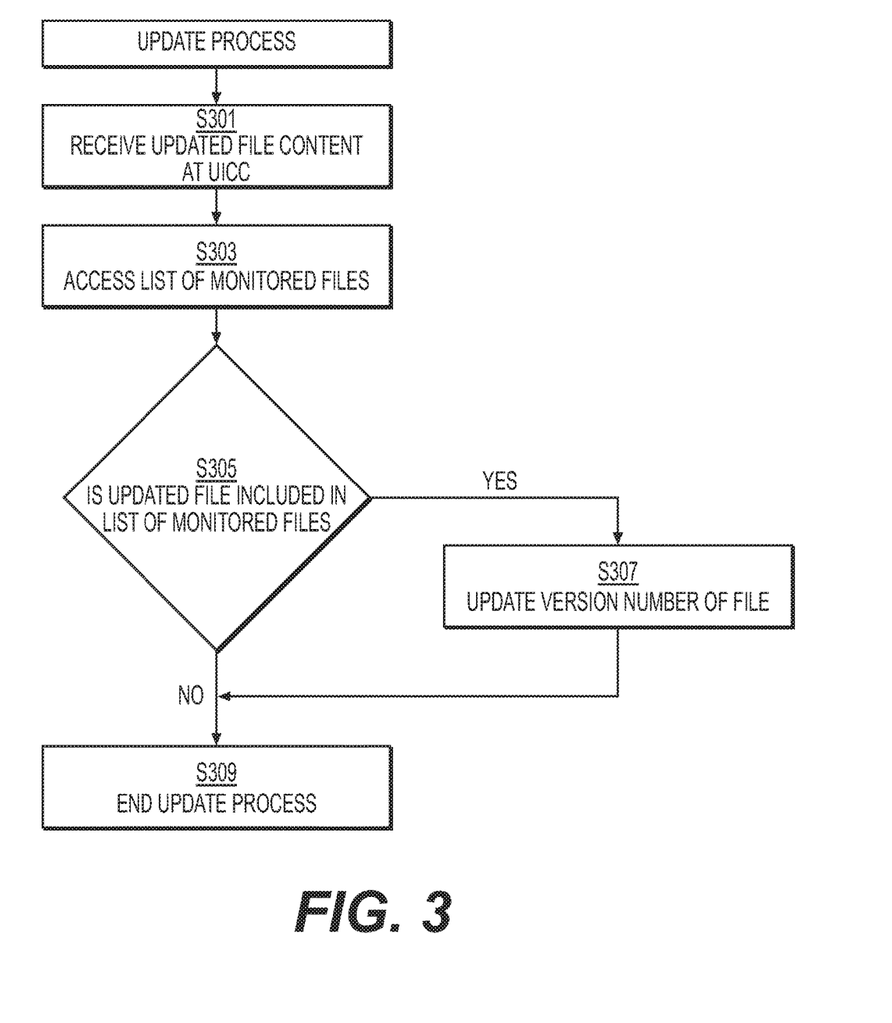
FIG. 3 is a flow chart showing an implementation of an update process performed at the UICC shown in FIG. 1.

An example process of updating files now is described with reference to FIG. 3. In particular, FIG. 3 is a flow chart showing an implementation of an update process performed at a UICC. In S301, the UICC receives updated file content for a particular file. For example, the updated file content is received from the ME or via an over-the-air (OTA) update. In S303, the list of monitored files is accessed at the UICC, at the ME, or elsewhere. Based on the list of monitored files, it is determined in S305 whether the file updated in S301 is included in the list of monitored files. If the file updated in S301 is included in the list of monitored files (S305: YES), the process proceeds to S307 and the version number of the file stored on the UICC is updated to indicate that the monitored file has been updated. Thereafter, the process proceeds to S309 and the update process for the particular file ends. If the file updated in S301 is not included in the list of monitored files (S305: NO), S307 is omitted, and the process proceeds to S309 during which the update process for the particular file ends. The update process of FIG. 3 may be performed for a plurality of different files. In certain implementations, the process of FIG. 3 is performed by the ME. In some implementations, the process of FIG. 3 is performed by a processing component of the UICC. In other implementations, the process of FIG. 3 is performed by a another device. For example, an OTA file update may also automatically update the version number for the updated files.

In exemplary implementations of the present invention, a simple sequence number is used and associated with the file content of a UICC or with the file content of the cache of a wireless device or other ME. For example, the sequence number may represent a version number for the file content. In addition, the UICC is uniquely defined. Some implementations use the integrated circuit card identifier (ICCID) of the UICC for this purpose. In some other implementations, the UICC includes instructions to generate a globally unique identifier (GUID) that is used for identification purposes. Because ICCIDs may not be unique, using a GUID in lieu of an ICCID may help to avoid issues arising from a duplicated ICCID. In particular implementations, although a sequence number is used as the version number, the ME does not make assumptions on the structure of this value.

In certain implementations, an application on the UICC maintains the version numbers for a subset of the files on the UICC. Whenever the content of one of these files on the UICC is either externally or internally updated, the application increments the version number. On powering up ME, which includes the UICC and supports a caching mechanism of the present invention, the ME interrogates the UICC for its GUID (or ICCID if ICCID is used as the unique identifier for the UICC) and checks whether the ME has cached information associated with the GUID (or ICCID) of the UICC. The ME then checks the version numbers of the files that are cached and associated with the GUID (or ICCID) of the UICC. If the version numbers associated with the cached files indicate changes have occurred, the cache is updated by reading the changed files from the UICC and caching such files in the ME.

In contrast, if the UICC is installed in ME that does not support a caching mechanism of the present invention, the ME will read the UICC and access the files required for initialization when the ME is powered up. Consequently, initialization of the ME may take a greater time than it would if the ME supported a caching mechanism of the present invention.

Figure 4:
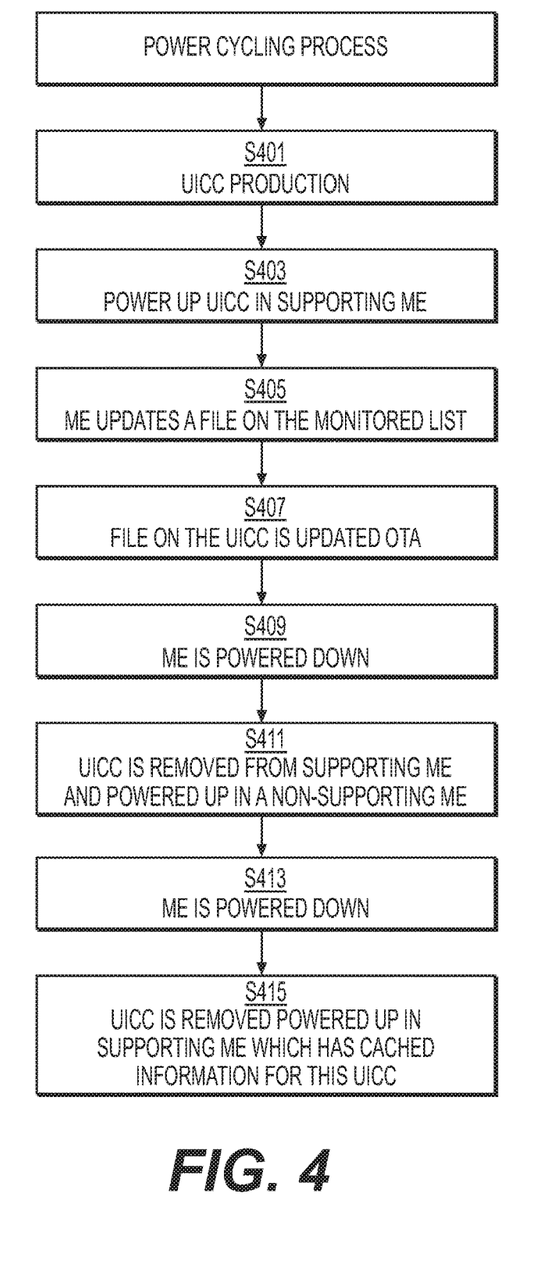
FIG. 4 is a flow chart showing an implementation of a power cycling process for a piece of mobile equipment including a universal integrated circuit card installed therein.

Example power cycling processes for ME including a UICC now are described with reference to FIG. 4 for some implementations that support a caching mechanism of the present invention and for alternative implementations that do not support a caching method of the present invention. Specifically, FIG. 4 is a flow chart showing an implementation of a power cycling process for a piece of ME including a UICC installed therein.

S401 is a process of UICC production. During the UICC production process, the UICC file content is personalized. In particular, the UICC generates a GUID (or ICCID) and initializes the version numbers of the file content that the UICC has been configured to monitor.

S403 is a process of powering up the UICC to support operations of the ME in which the UICC is installed. In particular, the ME asks the UICC for the UICC's GUID. The ME typically will not have any record of this GUID, so the ME may need to read the entire content of the UICC. A similar process of reading the entire content of the UICC would be performed if the ME is not configured to perform a caching operation. In addition, the ME reads out the list of files that the UICC is monitoring and the version numbers for such files that are being monitored. The ME subsequently records this information in the ME's cache.

S405 is a process in which the ME updates a file on the monitored list. In particular, the ME updates a file stored in the ME's cache (or in the UICC) and determines whether the updated file is included in the list of files that are being monitored. If the ME determines that the updated file is included in the list of files being monitored, then the ME updates the corresponding file stored in the UICC (or the ME's cache), reads the version number for that file from the UICC, and updates the file stored in the ME's cache with the new version number (and new content if not already updated).

S407 is a process in which a file on the UICC is updated OTA by, for example, a network carrier. In particular, the OTA update is typically a remote update pushed out to the UICC via the ME. After the file on the UICC is updated, the UICC automatically updates the version number of the file on the UICC. If the OTA update includes an instruction for the UICC to issue a REFRESH command for the file or the UICC is otherwise configured to issue a REFRESH command for the file in response to receiving an OTA update, the ME will read the file content as instructed by the REFRESH command, and the ME will also read the new version number for the content. If the OTA update does not include an instruction for the UICC to issue a REFRESH command for the file or the UICC is not otherwise configured to issue a REFRESH command for the file in response to receiving an OTA update, the file content and version number on the card will be updated on the UICC, but the ME may not be aware that the file content and version number have changed.

S409 is a process of powering down the ME.

S411 is a process in which the UICC (including the previously-updated file) is removed from the ME supporting the caching method of the present invention and installed in and initialized by another ME that does not support the caching method of the present invention. Here, the ME will not request the GUID or version information from the UICC. Nevertheless, because the version-tracking functionality is integrated into the UICC, the UICC will still automatically update the version information for a monitored file whenever the content of the monitored file is updated.

S413 is a process of powering down the ME.

S415 is a process in which the UICC (including the previously-updated file) is removed from the ME that does not support the caching method of the present invention and is installed in and initialized by ME that has previously cached a file corresponding to a file stored on the UICC in accordance with the caching method of the present invention. Here, the ME reads the GUID and recognizes that the ME has previously cached information associated with the UICC. The ME subsequently reads the version numbers for the files on the monitored list and, if the version number of a file stored in the UICC differs from the version number of the corresponding file stored in the cache of the ME, the ME reads out the content of the file from the UICC and updates the ME's cached data with the updated file content. Thus, the ME may omit reading files from the UICC and storing such files in the ME's cache when the version numbers of such files have not changed.

Some exemplary implementations of the UICC managing version numbers of files stored therein now are described. In some implementations, version numbers are based on a sequence number of updates (e.g., a first update is designated with a version number "01," a second update is designated with a version number "10," a third update is designated with a version number "11"). In other implementations, a random number is used as the version number (e.g., a first update is designated with a version number "100," a second update is designated with a version number "001," a third update is designated with a version number "110"). In still other implementations, a hash of the file content is used as the version number. In still further implementations, other representative identifiers are used as the version number. Each of these implementations provides a variety of features that affect version number provisioning.

Using a sequence number of updates or a sequence counter may provide for increased calculation speed and reduced processor utilization. Further, there is a reduced (or possibly non-existent) likelihood that a version number will be repeated for successive updates of the same file when using a sequence number of updates or a sequence counter. In addition, the sequence number provides information about the total number of updates or even the frequency of such updates. Nevertheless, problems may arise in situations in which third-party or other applications update file content on the UICC unless such applications are also configured to update the sequence numbers for such files.

Sequence numbers also may be affected by "wrap-around," wherein the sequence counter is reset when the number of updates exceeds the space allocated for storing such number. Consequently, when wrap-around occurs, the sequence number of a file may be repeated. In implementations in which files are frequently updated and limited space is allocated to storing version numbers, this repetition allows for the possibility that a version number assigned to an updated file in the UICC matches the version number of an older (e.g., not updated) version of the file. Moreover, incremented sequence numbers occurring after the wrap-around condition occurs will be lower than the previous sequence number prior to the occurrence of the wrap-around condition. Thus, version numbers set prior to the occurrence of the wrap-around condition will improperly appear more up-to-date than version numbers set after the occurrence of the wrap-around condition because the later-set version numbers will be lower.

In particular implementations, wrap-around may be addressed by resetting the GUID of the UICC when the version number of a file reaches a predetermined upper-limit value. For example, when a sequence number is used for the version number and the value of the version number reaches the upper-limit value, the GUID is reset to a new value and the version numbers for all files associated with the UICC are reset to zero. Thereafter, an indication that the GUID has been reset is provided to the ME. Specifically, the UICC returns an error code to the ME when the ME requests a version number after the GUID has been reset. The error code indicates to the ME that the ME should read the reset GUID from the UICC. Thus, the UICC continues returning the error code in response to requests for version numbers until the ME reads the reset GUID from the UICC.

Figure 5:
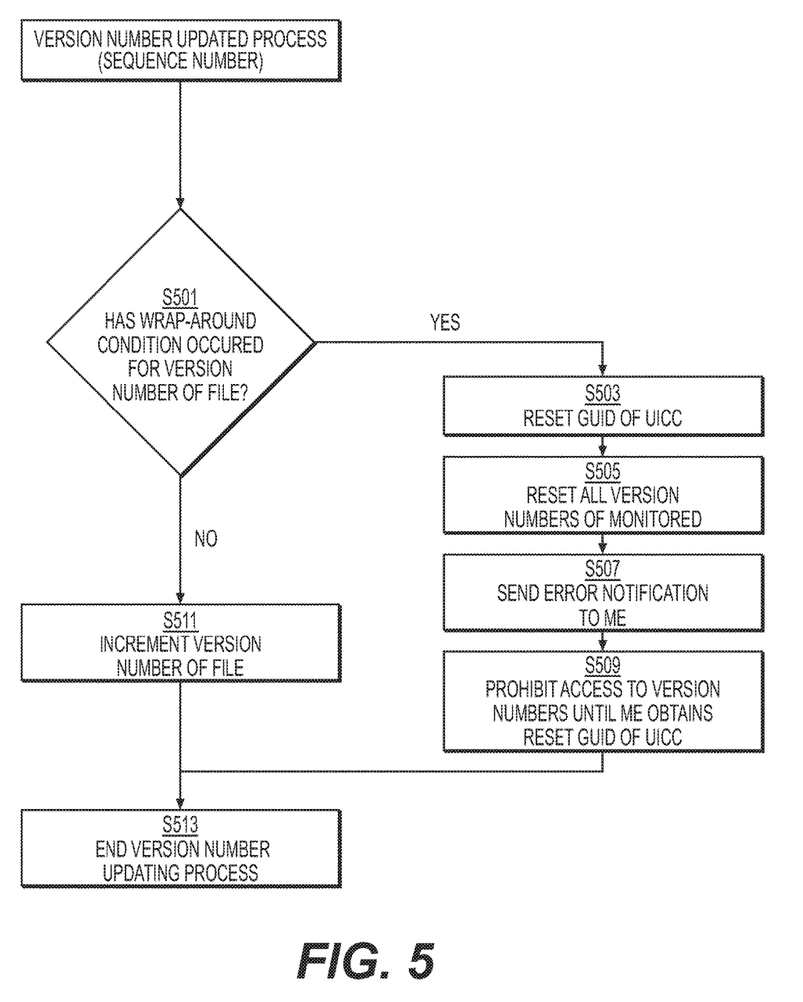
FIG. 5 is a flow chart showing an implementation of a version number updating process using sequence numbers.

An example of the above-described process now is described with reference to FIG. 5. In particular, FIG. 5 is a flow chart showing an implementation of a version number updating process using sequence numbers. The process of FIG. 5 is implemented at S307 when the version number of an updated file is updated at the UICC, for example. In S501, it is determined whether incrementing the sequence number corresponding to the version number for a file will cause the wrap-around condition to occur. In other words, it is determined whether incrementing the sequence number will exceed the space allocated for storing such number, cause the sequence number to return to the "zero" value, and provide for a subsequent version number that appears lower (e.g., older) than the current sequence number. If incrementing the sequence number will cause the wrap-around condition to occur (S501: YES), the process proceeds to S503, in which the GUID of the UICC is reset to another value and this reset value is stored on the UICC. Thereafter, the process proceeds to S505 and the version numbers of all monitored files are reset to the "zero" value and these reset values are stored on the UICC. Subsequently, an error notification is generated in S507, which indicates that the GUID has been reset. In certain implementations, the error notification indicates to the ME that the ME needs to obtain new instances of all of the monitored files from the UICC and overwrite the files previously stored in the cache with these new instances. In S509, access to the list of reset version numbers stored in the UICC is prohibited until the ME has obtained the reset GUID of the UICC. S503, S505, S507, and S509 may be performed in parallel or in series in any order, for example. After performing S503, S505, S507, and S509, the process proceeds to S513 and ends the version number updating process. In contrast, if incrementing the sequence number will not cause the wrap-around condition to occur (S501: NO), the process proceeds to S511 and the version number of the relevant monitored file is incremented. Thereafter, the process proceeds to S513 and ends the version number updating process. In certain implementations, the process of FIG. 5 is performed by the ME. In some implementations, the process of FIG. 5 is performed by a processing component of the UICC.

When the GUID and the file version numbers are reset in certain implementations described above, however, the ME may be unable to properly compare version numbers between files stored in the ME's cache and files stored on the UICC. In such a situation, the ME may read all monitored files from the UICC, and the initialization time may be increased. Nevertheless, particular implementations avoid this potential increase in initialization time by resetting only the version number of the file that reached the upper-limit value and associating the existing version numbers of the other monitored files with the new GUID.

Using a random number as the version number for a file also may provide for increased calculation speed and reduced processor utilization. Further, although it is possible that the same random number could be repeated for successive updates, the problem of repeated version numbers may be avoided by generating a new random number if the generated random number matches the current version number. In addition, using random numbers as version numbers may avoid the problem of wrap-around by limiting the possible numbers to a pool of numbers having sizes that do not exceed the space allocated for storing the version number and by not establishing an incremental sequence of version numbers. Nevertheless, problems similar to those described above for sequence numbers also may arise in situations in which third-party or other applications update file content on the UICC unless such applications are also configured to generate version numbers based on random numbers selected from the same pool of numbers.

Using a hash of the file content is used as the version number may also avoid the problem of wrap-around by limiting the size of the hash, such that the hash does not exceed the space allocated for storing the version number, and by not establishing an incremental sequence of version numbers. In addition, using a dynamically calculated hash may avoid the problems associated with situations in which third-party or other applications update file content on the UICC. In particular, if the hash is dynamically determined for all files on the UICC, then the hash itself will indicate whether a file has been updated and there is no need for such other applications to update file version numbers. Nevertheless, calculating a hash requires substantial calculation time and processor utilization and, consequently, may slow down the initialization process or even the operational functions of the ME. Moreover, the likelihood of repeating hash numbers decreases with the size of the hash. For example, a hash of 4 bytes results in a confidence of 1 in 64,000 that the hash numbers are not repeated. Accordingly, both an increased allocation of space for the version number and an increased processor utilization and time is required to reduce the possibility of repeated numbers. Consequently, the possibility of repeated numbers may be unacceptable in certain implementations.

In particular implementations, for example, the interface between the ME and the UICC is file-based. In some file-based implementations, new dedicated files (DFs) are included in the MF file system. This structure includes three files, for example. The first file contains a sequence of the version numbers. The second file contains a list of the files being monitored and a pointer to the version number of each file stored in the first file. The third file contains the current GUID of the UICC. In some implementations of the file-based interface, the GUID is regenerated when the file monitoring list is updated, and all of the file version numbers are reset.

In certain implementations, for example, the interface between the ME and the UICC is applet-based. For example, an applet using a standard APDU interface is be used to access the version numbers and the monitoring list. The version numbers and monitoring list are accessed using GET DATA commands for specific tags or using applet specific commands. Such an applet interface may be combined with the file-based interface to further provide efficient file access.

In some implementations, the file-based interface or the applet-based interface is accessed using a secondary logical channel. Moreover, by using such interfaces, the UICC and ME remain secure if updates to the monitored file list remain secure. In addition, while the file-based interface generally may be simpler to implement, the applet-based interface avoids pollution of the UICC file-space caused by the addition of the new DFs.

In particular implementations, a variety of files are monitored and cached. For example, the files required for the ME to register on the network following a reboot are monitored and cached. In addition, other files that may be read in the background without causing problems with operation of the ME may also be included. Even if the reading of such files is delayed until after the network registration has begun, there may still be a benefit in caching such files. In contrast, high update activity files, for example, are generally not monitored and cached because the monitoring application would need to handle substantial numbers of updates to the file version information. Further, such high update activity files are typically of insubstantial size and, thus, quick to read. Consequently, so the benefit of caching such high update activity files is generally negated due to this increased complexity. In general, if monitoring and caching a file is likely to improve performance and speed of initialization, such a file is generally a strong candidate for inclusion in the monitoring list.

In an alternative implementation, for example, a version number is determined for the overall system configuration. For example, a single version number is established based on the status of all files specified in a monitoring list. The version number is updated when any of the specified files is updated. While this implementation may require the ME to periodically read and cache all of the monitored files from the UICC (e.g., after the version number is updated), this implementation may simplify the process of adding version numbers and reduce related processing time in situations in which the monitored files are not updated.

In an example implementation of the invention, processes and systems disclosed herein are implemented by a File Monitor applet that is stored as a set of computer-readable instructions on computer-readable media. The application may be written using the Java programming language, for example. In particular implementations, the File Monitor applet provides a reduced boot-up time for devices interacting with the universal integrated circuit card (UICC) as compared with existing systems configured to read initialization files from the UICC without regard to the information stored in the device cache.

Some files in the application dedicated file (ADF) universal subscriber identity module (USIM), code division multiple access subscriber identity module (CSIM), and IP multimedia service identity module (ISIM) are quite large in size, so the reading of these files takes a considerable amount of time. For example, the file $EF_{ePRL}$ (elementary file containing an extended preferred roaming list) in ADF CSIM is often 12K or more in bytes, and reading the file would require the device to issue around 48 READ BINARY APDUs (application protocol data units). To help reduce the boot-up time, the File Monitor applet keeps track of changes for flagged files, so that the device does not need to read the flagged files on every boot-up. Example implementations of processes for flagging and recording such file changes, adding and removing files to/from a tracking list, determining what files are to be monitored on the UICC, and configuring such files to be monitored are described herein.

To reduce boot-up time, updates to large files on the UICC are tracked, so that the device does not need to read these large files to retrieve the content if the device's current cache is still valid. For example, when a UICC is inserted into a device for the first time, the device reads all the files that the device needs on boot-up and caches the content of these files into the device's memory. On a subsequent boot-up, the device first reads the content of $EF_{FileMonitor}$ (elementary file containing a list of files to be monitored by the File Monitor applet) to determine if any of the flagged files has been updated. If a flagged file has been updated, the device may skip the reading of the flagged file and the boot-up time is reduced. The File Monitor applet keeps track of changes for flagged files in $EF_{FileMonitor}$ (6F04) under the master file (MF) file tree. An example file path for $EF_{FileMonitor}$ in the present implementation would be 3F00/7F48/6F04.

Figure 6:
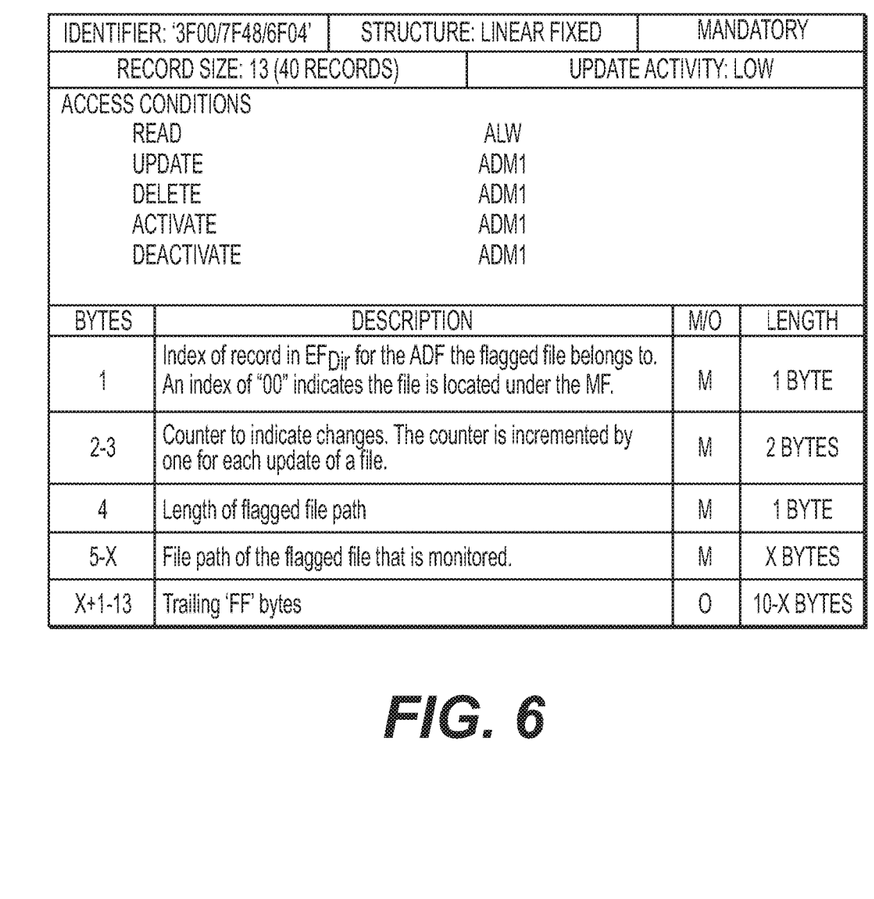
FIG. 6 is a schematic representation showing the structure and permissions associated with an implementation of an elementary file used to store information about updated files.
Figure 7:
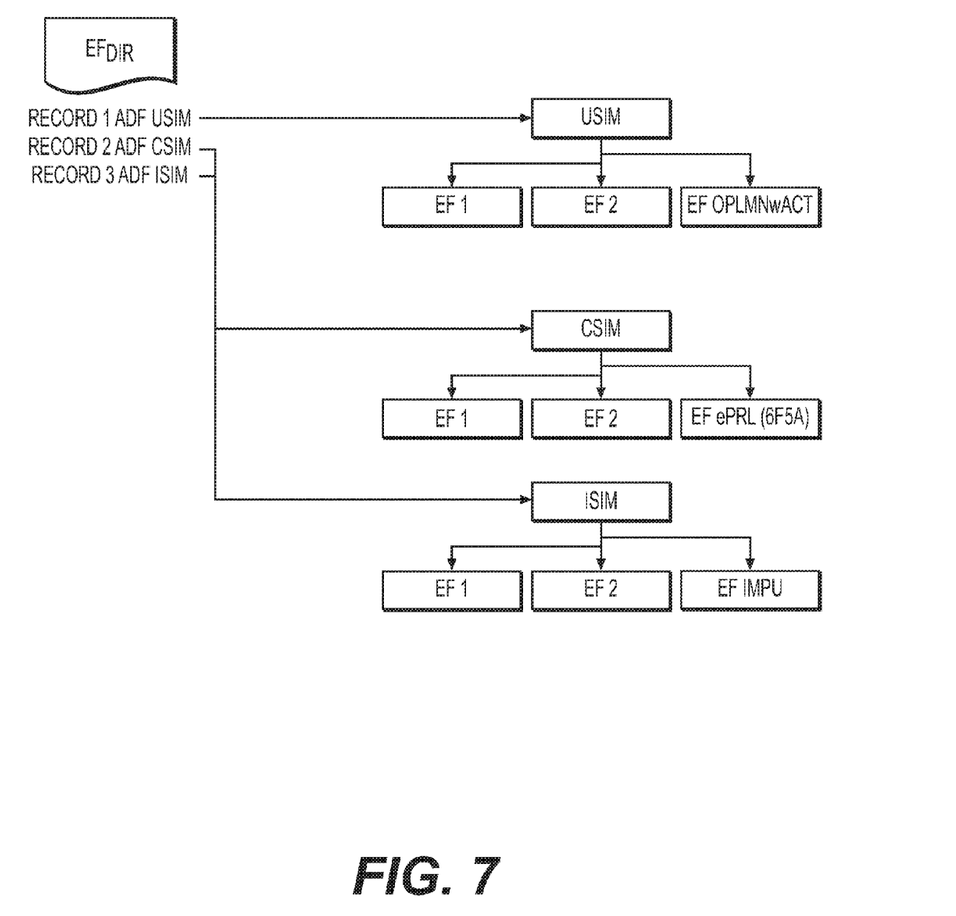
FIG. 7 is a schematic representation showing according to an implementation of a UICC with a particular configuration.

An example implementation of $EF_{FileMonitor}$ has the structure shown in FIG. 6, which is a schematic representation showing the structure and permissions associated with an implementation of an elementary file used to store information about updated files. In the implementation of FIG. 6, each record in $EF_{FileMonitor}$ pertains to a flagged file. The first byte of each record in $EF_{FileMonitor}$ indicates which ADF in $EF_{Dir}$ (elementary file directory) the flagged file belongs to. A value of "00" is used to indicate the file is located under the MF. For example, in some implementations, the UICC is setup with the configuration shown in FIG. 7. To monitor the $EF_{ePRL}$ in ADF CSIM, the record in $EF_{FileMonitor}$ is encoded as: "02 00 00 02 6F 5A FF FF FF FF FF FF FF FF," for example. The "02" indicates the file belongs to the ADF CSIM specified in record 2 of $EF_{Dir}$.

In the example implementation described above, the next two bytes of each record in $EF_{FileMonitor}$ are the counter bytes. These bytes are initially set to "00 00." For every update to the flagged file, the counter bytes are incremented by one. For example, if $EF_{ePRL}$ is flagged for monitoring and $EF_{ePRL}$ is updated by the device, the counter bytes will be incremented by 1. The value will go from "00 00" to "00 01." For testing purposes, the counter bytes may optionally be updated to reset the counter value. Thus, a change in the counter bytes entry for a file indicates that the file has been updated.

In the example implementation described above, the fourth byte for each record is the length of the file path of the flagged file to be monitored. The remaining bytes after the file path length bytes are for storing the file path value. For example, the record in $EF_{FileMonitor}$ for $EF_{ePRL}$ may be: "02 00 00 02 6F 5A FF FF FF FF FF FF FF FF." The "02" indicates the file path length is two bytes ("6F 5A"). The "6F 5A" is the file path of the flagged file. Any remaining bytes in the record at set to "FF."

Files within the ADF USIM, CSIM, and ISIM may be added to the tracking list for the File Monitor applet to track updates. The test UICCs may be prepopulated with 7 records, for example. In the implementation now described, to add a file for the File Monitor applet to track, an unused record of $EF_{FileMonitor}$ is populated. For example, to add $EF_{MSISDN}$ (elementary file containing a mobile station international subscriber directory number) of the USIM, the content of "01 00 00 02 6F 40 FF FF FF FF FF FF FF" is populated to record 8. Similarly, a file may be removed from the tracking list by populating the record with all "FF."

In the foregoing example implementation, to prevent the device from having to read all of the records of $EF_{FileMonitor}$ (e.g., 40 records) to determine what files are monitored, $EF_{FileMonitor}$ is structured such that no empty records exist in between the encoded records, and the device is configured to stop reading of $EF_{FileMonitor}$ on the first record that it encounters that is set to all "FF."

In certain example implementations of the File Monitor applet, test UICCs included with the File Monitor applet are preconfigured to track one or more of the following files:

ePRL (6F5A: CSIM)—7th record of $EF_{FileMonitor}$;
MSPL (4F21: MF-Telecom-MMSS)—2nd record of $EF_{FileMonitor}$;
MLPL (4F20: MF-Telecom-MMSS)—1st record of $EF_{FileMonitor}$;
HPLMNwAcT (6F62: USIM)—4th record of $EF_{FileMonitor}$;
OPLMNwAcT (6F61: USIM)—3rd record of $EF_{FileMonitor}$;
SPDI (6FCD: USIM)—5th record of $EF_{FileMonitor}$; and
EHPLMN (6FD9: USIM)—6th record of $EF_{FileMonitor}$.

Under certain conditions, a race condition may occur that results in the File Monitor applet and the device becoming out-of-sync with each other. For example, the File Monitor applet may be triggered when one of the flagged files is updated by the device or over the air (OTA) by a carrier. An example sequence of such an operation is as follows:
1. Update command to update a file is issued (by the device or through an OTA signal);
2. The UICC operating system (OS) performs the update command to update the corresponding file; and
3. After updating the file, the UICC OS triggers the File Monitor applet to increment a counter in $EF_{FileMonitor}$ if the file updated is a flagged file.

In the above sequence, if the UICC is reset in between processes 2 and 3 above, the device and the File Monitor applet may become out of sync. Thus, even though a file monitored by the File Monitor applet is appropriately updated when this race condition occurs, the update is not tracked because a reset occurred before the File Monitor applet was triggered. Consequently, the occurrence of such a race condition may be noted, and on the next initialization or boot-up, the device is configured to determine that the race condition previously occurred and not read the updated flagged file from the device cache. Accordingly, the device may subsequently read the file from the SIM card because the changes were not properly tracked by the File Monitor applet.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Any combination of one or more computer-readable media may be utilized to store computer-readable instructions described herein. The computer-readable media may be a computer-readable signal medium or a computer-readable storage medium, for example. A computer-readable storage medium may be, for example, but not limited to, an electronic, magnetic, optical, electromagnetic, or semiconductor system, apparatus, or device, or any suitable combination of the foregoing. More specific examples (a non-exhaustive list) of such a computer-readable storage medium include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, a subscriber identity module (SIM) card or other universal integrated circuit card (UICC), memory integrated with or separate from the wireless device, or any suitable combination of the foregoing or other data carriers. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to satellite communications, wireless, wireline, optical fiber cable, RF signals, or any suitable combination of the foregoing.

Computer program code for carrying out operations for aspects of the present disclosure may be written in any combination of one or more programming languages, including an object oriented programming language, such as JAVA, C++, C#, or other suitable programming languages. The program code may execute entirely on a user's device, partly on a user's device, as a stand-alone software package, partly on a user's device and partly on a remote computer, or entirely on a remote computer or server. In the latter scenario, a remote computer may be connected to a user's device through any type of network, including a satellite communications network, a local area network (LAN), or a wide area network (WAN), or the connection may be made to an external computer (for example, through the Internet using an Internet Service Provider) or offered as a service, such as, for example, a Software as a Service (SaaS), e.g., over a secure web interface via a https connection.

Aspects of the present disclosure are described herein with reference to flowchart illustrations and/or block diagrams of methods, apparatuses (including systems), and computer program products. Individual blocks of the flowchart illustrations and/or block diagrams, and combinations of blocks in the flowchart illustrations or block diagrams, may be implemented by computer program instructions, for example. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the function(s) specified in the flowcharts or block diagram block(s).

These computer program instructions may also be stored in a computer-readable medium. When accessed from the computer-readable medium and executed, the computer program instructions may direct a computer, other programmable data processing apparatus, or other devices to function in a particular manner, such that the instructions when stored in the computer-readable medium produce an article of manufacture including instructions that, when executed, cause a computer to implement the function(s) specified in the flowchart or block diagram block(s). The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the function(s) specified in the flowcharts or block diagram block(s). For example, wireless devices described herein are examples of such programmable data processing apparatuses.

Aspects of the present disclosure may be implemented by various combinations of apparatuses, devices, systems, or components thereof, for example. Reference in the appended claims to an apparatus, device, or system or a component thereof being configured to or operable to perform a particular function encompasses that apparatus, system, component, or device, whether such apparatus, system, component, or device or such particular function is activated, turned on, or unlocked, as long as that apparatus, system, or component is so configured or operable.

While the invention has been described in connection with various example structures, configurations, and illustrative implementations, it will be understood by those skilled in the art that other variations and modifications of the structures, configurations, and implementations described above may be made without departing from the scope of the invention. For example, the scope of this application comprises all possible combinations of the various elements and features disclosed and incorporated by reference herein, and the particular elements and features presented in the claims and disclosed and incorporated by reference above may be combined with each other in other ways within the scope of this application, such that the application should be recognized as also directed to other implementations comprising other possible combinations. Other structures, configurations, and implementations consistent with the scope of the claimed invention will be apparent to those skilled in the art from a consideration of the specification or practice of the invention disclosed herein. It is intended that the specification and the described examples are illustrative with the true scope of the invention being defined by the following claims.

What is claimed is:

1. A method for monitoring updates on a data carrier module, the method comprising:
   a process of initializing a mobile device to communicate on a telecommunications network, a first data carrier module being physically installed in the mobile device, and the process of initializing the mobile device comprising:
      obtaining a first identifier from the first data carrier module, the first identifier identifying the first data carrier module;
      storing a first plurality of data files from the first data carrier module in a cache of the mobile device, the first plurality of data files including:
         a first monitored data file subset comprising a plurality of monitored files that is a subset of the first plurality of data files, and
         a first list of version numbers including a version number for each monitored data file of the first monitored data file subset; and
   a process of reinitializing the mobile device to communicate on the telecommunications network, a second data carrier module being physically installed in the mobile device, a second plurality of data files are stored on the second data carrier module comprising:
      a second monitored data file subset comprising a plurality of monitored files that is a subset of the second plurality of data files corresponding to the first monitored data file subset, and
   a second list of version numbers including a version number for each monitored data file of the second monitored data file subset,
   the process of reinitializing the mobile device comprising:
   obtaining a second identifier from the second data carrier module, the second identifier identifying the second data carrier module;
   determining whether the second identifier is the same as the first identifier:
      in response to determining that the second identifier is the same as the first identifier, determining whether a version number of a monitored data file currently stored in the cache in the first list of version numbers is the same as a version number stored in the second list of version numbers of a corresponding monitored data file currently stored on the second data carrier module; and
      in response to determining that the version number of the monitored data file currently stored in the cache is not the same as the version number of the corresponding monitored data file currently stored on the second data carrier module:
         replacing the monitored data file currently stored in the cache with the corresponding monitored data file from the second monitored data file subset on the second data carrier module; and
         loading the plurality of predetermined monitored data files from the cache after replacing the monitored data file stored in the cache with the corresponding monitored data file; and
      in response to determining that the version number of the monitored data file in the first list of version numbers currently stored in the cache is the same as the version number in the second list of version numbers of the corresponding monitored data file currently stored on the second data carrier module, loading the first monitored data file subset from the cache without storing the corresponding monitored data file from the second data carrier module in the cache; and
   updating the first list of version numbers stored on the first data carrier module in response to receiving updated content for at least one monitored data file of the first monitored data file subset,
   wherein the updating includes changing the version number for the at least one monitored data file of first monitored data file subset to a different version number,
   wherein the first data carrier module, as updated, is the second data carrier module comprising the second plurality of data files such that the first identifier is the same as the second identifier.

2. The method of claim 1, wherein the corresponding monitored data file of the second monitored data file subset is an updated version of the monitored data file of the first monitored data file subset.

3. The method of claim 1,
wherein the second data carrier module is the first data carrier module, and
wherein the first identifier is the same as the second identifier.

4. The method of claim 3, wherein the corresponding monitored data file of the second monitored data file subset is identical to the monitored data file of the first monitored data file subset.

5. The method of claim 1, wherein the first plurality of data files includes:
a first data file including a list identifying each monitored data file of the first monitored data file subset, and
a second data file including the first list of version numbers.

6. The method of claim 5, further comprising:
in response to determining that the version number of at least one monitored data file of the first monitored data file subset currently stored in the cache is not the same as the version number of at least one corresponding monitored data file of the second monitored data file subset currently stored on the second data carrier module, replacing the second data file, which is currently stored in the cache, with an updated second data file from the second data carrier module, the updated second data file including the version number of the at least one corresponding monitored data file of the second monitored data file subset currently stored on the second data carrier module.

7. The method of claim 1, further comprising:
in response to determining that the second identifier is not the same as the first identifier:
replacing the first plurality of data files currently stored in the cache with the second plurality of data files from the second data carrier module; and
loading the first monitored data file subset from the cache after replacing the first plurality of data files stored in the cache with the second plurality of data files from the second data carrier module,
wherein the first data carrier module is distinct from the second data carrier module, and
wherein the second identifier is not the same as the first identifier.

8. The method of claim 1, wherein each of the first data carrier module and the second data carrier module is one of:
a Subscriber Identity Module ("SIM");
a Universal Integrated Circuit Card ("UICC");
a virtual SIM;
an electronic SIM; a simple storage device; and
another storage device with processing capability.

9. A system comprising:
a mobile device comprising a cache; and
one or more data carrier modules configured as a first data carrier module and a second data carrier module,
wherein the mobile device is configured to perform processes comprising:
a process of initializing the mobile device to communicate on a telecommunications network, the first data carrier module being physically installed in the mobile device, and the process of initializing the mobile device comprising:
obtaining a first identifier from the first data carrier module, the first identifier identifying the first data carrier module;
storing a first plurality of data files from the first data carrier module in the cache, the first plurality of data files including:
a first monitored data file subset comprising a plurality of files that is a subset of the first plurality of data files, and
a first list of version numbers including a version number for each monitored data file of the first monitored data file subset; and
a process of reinitializing the mobile device to communicate on the telecommunications network, the second data carrier module being physically installed in the mobile device, a second plurality of data files are stored on the second data carrier module comprising:
a second monitored data file subset comprising a plurality of files that is a subset of the second plurality of data files corresponding to the first monitored data file subset, and
a second list of version numbers including a version number for each monitored data file of the second monitored data file subset,
the process of reinitializing the mobile device comprising:
obtaining a second identifier from the second data carrier module, the second identifier identifying the second data carrier module;
determining whether the second identifier is the same as the first identifier; and
in response to determining that the second identifier is the same as the first identifier, determining whether a version number of a monitored data file currently stored in the cache in the first list of version numbers is the same as a version number stored in the second list of version numbers of a corresponding monitored data file currently stored on the second data carrier module; and
in response to determining that the version number of the monitored data file currently stored in the cache is not the same as the version number of the corresponding monitored data file currently stored on the second data carrier module:
replacing the monitored data file currently stored in the cache with the corresponding monitored data file from the second monitored data file subset on the second data carrier module; and
loading the plurality of monitored data files from the cache after replacing the monitored data file stored in the cache with the corresponding monitored data file; and
in response to determining that the version number of the monitored data file in the first list of version numbers currently stored in the cache is the same as the version number in the second list of version numbers of the corresponding monitored data file currently stored on the second data carrier module, loading the first monitored data file subset from the cache without storing the corresponding monitored data file from the second data carrier module in the cache; and
updating the first list of version numbers stored on the first data carrier module in response to receiving updated content for at least one monitored data file of the first monitored data file subset, wherein the updating includes changing the version number for the at least one monitored data file of first monitored data file subset to a different version number, wherein the first data carrier module, as updated, is the second data carrier module comprising the second plurality of data files such that the first identifier is the same as the second identifier.

10. The system of claim 9, wherein the one or more data carrier modules consists of one data carrier module configured as the first data carrier module and the second data carrier module, and wherein the corresponding monitored data file of the second monitored data file subset is an updated version of the monitored data file the first monitored data file subset.

11. The system of claim 9, wherein the one or more data carrier modules consists of one data carrier module configured as the first data carrier module and the second data carrier module, wherein the first identifier is the same as the second identifier, and wherein the corresponding monitored data file of the second monitored data file subset is identical to the monitored data file of the first monitored data file subset.

12. The system of claim 9, wherein the first plurality of data files includes:

a first data file including a list identifying each monitored data file of the first monitored data file subset, and a second data file including the first list of version numbers.

13. The system of claim 12, wherein the mobile device is configured to perform processes further comprising:

in response to determining that the version number of at least one monitored data file of the first monitored data file subset currently stored in the cache is not the same as the version number of at least one corresponding monitored data file of the second monitored data file subset currently stored on the second data carrier module, replacing the second data file, which is currently stored in the cache, with an updated second data file from the second data carrier module, the updated second data file including the version number of the at least one corresponding monitored data file of the second monitored data file subset currently stored on the second data carrier module.

14. The system of claim 9, wherein one data carrier module of the one or more data carrier modules is configured as the first data carrier module and a different data carrier module of the one or more data carrier modules is configured as the second data carrier module, such that the first data carrier module is distinct from the second data carrier module and the second identifier is not the same as the first identifier, and wherein the mobile device is configured to perform processes further comprising:

in response to determining that the second identifier is not the same as the first identifier:

replacing the first plurality of data files currently stored in the cache with the second plurality of data files from the second data carrier module; and loading the first monitored data file subset from the cache after replacing the first plurality of data files stored in the cache with the second plurality of data files from the second data carrier module.

15. The system of claim 9, wherein each of the first data carrier module and the second data carrier module is one of:

a Subscriber Identity Module ("SIM");

a Universal Integrated Circuit Card ("UICC");

a virtual SIM;

an electronic SIM;

a simple storage device; and another storage device with processing capability.

16. A non-transitory, computer-readable medium storing computer-readable instructions therein, which, when executed by at least one processor, instruct the at least one processor to control processes for monitoring updates on a data carrier module, the processes comprising:

a process of initializing a mobile device to communicate on a telecommunications network, a first data carrier module being physically installed in the mobile device, and the process of initializing the mobile device comprising:

obtaining a first identifier from the first data carrier module, the first identifier identifying the first data carrier module;

storing a first plurality of data files from the first data carrier module in a cache of the mobile device, the first plurality of data files including:

a first monitored data file subset comprising a plurality of monitored files that is a subset of the first plurality of data files, and a first list of version numbers including a version number for each monitored data file of the first monitored data file subset;

a process of reinitializing the mobile device to communicate on the telecommunications network, a second data carrier module being physically installed in the mobile device, a second plurality of data files are stored on the second data carrier module comprising:

a second monitored data file subset files that is a subset of the second plurality of data files corresponding to the first monitored data file subset, and a second list of version numbers including a version number for each monitored data file of the second monitored data file subset, the process of reinitializing the mobile device comprising:

obtaining a second identifier from the second data carrier module, the second identifier identifying the second data carrier module;

determining whether the second identifier is the same as the first identifier;

in response to determining that the second identifier is the same as the first identifier, determining whether a version number of a monitored data file currently stored in the cache in the first list of version numbers is the same as a version number stored in the second list of version numbers of a corresponding monitored data file currently stored on the second data carrier module; and in response to determining that the version number of the monitored data file currently stored in the cache is not the same as the version number of the corresponding monitored data file currently stored on the second data carrier module:

replacing the monitored data file currently stored in the cache with the corresponding monitored data file from the second monitored data file subset on the second data carrier module; and loading the monitored data files from the cache after replacing the monitored data file stored in the cache with the corresponding monitored data file; and in response to determining that the version number of the monitored data file in the first list of version numbers currently stored in the cache is the same as the version number in the second list of version numbers of the corresponding monitored data file currently stored on the second data carrier module, loading the first monitored data file subset files from the cache without storing the corresponding monitored data file from the second data carrier module in the cache;

receiving updated content for at least one monitored data file of the first monitored data file subset; and updating the first list of version numbers stored on the first data carrier module in response to receiving the updated content for at least one monitored data file of the first monitored data file subset, wherein the updating includes changing the version number for the at least one monitored data file of first monitored data file subset to a different version number, wherein the first data carrier module, as updated, is the second data carrier module comprising the second plurality of data files such that the first identifier is the same as the second identifier.

17. The non-transitory, computer-readable medium of claim 16, wherein the second data carrier module is the first data carrier module, wherein the first identifier is the same as the second identifier, and wherein the corresponding monitored data file of the second monitored data file subset is identical to the monitored data file of the first monitored data file subset.

18. The non-transitory, computer-readable medium of claim 16, wherein the first plurality of data files includes:

a first data file including a list identifying each monitored data file of the first monitored data file subset, and a second data file including the first list of version numbers.

19. The non-transitory, computer-readable medium of claim 16, wherein the computer-readable instructions instruct the at least one processor to perform further processes comprising:

in response to determining that the version number of at least one monitored data file of the first monitored data file subset currently stored in the cache is not the same as the version number of at least one corresponding monitored data file of the second monitored data file subset currently stored on the second data carrier module, replacing the second data file, which is currently stored in the cache, with an updated second data file from the second data carrier module, the updated second data file including the version number of the at least one corresponding monitored data file of the second monitored data file subset currently stored on the second data carrier module.

20. The non-transitory, computer-readable medium of claim 19, wherein the computer-readable instructions instruct the at least one processor to perform further processes comprising:

in response to determining that the second identifier is not the same as the first identifier:

replacing the first plurality of data files currently stored in the cache with the second plurality of data files from the second data carrier module, and loading the first monitored data file subset from the cache after replacing the first plurality of data files stored in the cache with the second plurality of data files from the second data carrier module, wherein the first data carrier module is distinct from the second data carrier module, and wherein the second identifier is not the same as the first identifier.

* * * * *